United States Patent
Yamazaki et al.

(10) Patent No.: US 6,552,984 B1
(45) Date of Patent: Apr. 22, 2003

(54) LIQUID CRYSTAL TILT SERVO APPARATUS

(75) Inventors: Hitoshi Yamazaki, Kawagoe (JP); Morio Nozaki, Kawagoe (JP); Takeshi Sato, Kawagoe (JP); Yuichi Kimikawa, Kawagoe (JP); Motoi Kimura, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/546,282

(22) Filed: Apr. 10, 2000

(30) Foreign Application Priority Data

Apr. 13, 1999 (JP) ............................. 11-104697

(51) Int. Cl.⁷ ............................................... G11B 7/00
(52) U.S. Cl. ................. 369/53.19; 369/44.32; 369/53.22; 369/112.02
(58) Field of Search ................. 369/44.32, 112.02, 369/44.23, 44.26, 44.41, 44.35, 59.17, 59.23, 124.13, 59.22, 53.19, 44.25, 53.22; 360/39, 48, 51

(56) References Cited

U.S. PATENT DOCUMENTS

| 5,566,155 A | * | 10/1996 | Hayashi | 369/59.22 |
| 5,808,979 A | * | 9/1998 | Ishibashi et al. | 369/124.13 |
| 5,886,496 A | * | 3/1999 | Furukawa et al. | 318/638 |
| 5,936,923 A | * | 8/1999 | Ootaki et al. | 369/112.02 |
| 6,078,556 A | * | 6/2000 | Furukawa et al. | 369/112.02 |
| 6,125,088 A | * | 9/2000 | Ogasawara | 369/112.02 |
| 6,137,754 A | * | 10/2000 | Furukawa et al. | 369/112.02 |
| 6,141,304 A | * | 10/2000 | Ogasawara | 369/112.02 |
| 6,246,648 B1 | * | 6/2001 | Kuribayashi | 369/112.02 |
| 6,388,967 B2 | * | 5/2002 | Furukawa et al. | 369/112.02 |

FOREIGN PATENT DOCUMENTS

JP        10-172163        6/1998

* cited by examiner

Primary Examiner—William Korzuch
Assistant Examiner—Kim-Kwok Chu
(74) Attorney, Agent, or Firm—Morgan, Lewis & Bockius LLP

(57) ABSTRACT

A liquid-crystal tilt servo apparatus in which a reference voltage generating circuit is unnecessary for a liquid-crystal driving circuit and which has a simple circuit configuration and high reliability is realized. The liquid-crystal driving circuit has a DC removing circuit for removing a DC component of a driving signal generated on the basis of a tilt error correction control signal from a control unit and supplying a resultant signal to a liquid crystal device.

2 Claims, 5 Drawing Sheets

LIQUID CRYSTAL TILT SERVO APPARATUS

BACKGROUND OF THE INVENTION

1. Field of the Invention

The present invention relates to a tilt servo apparatus of an optical disc recording/reproducing apparatus and, more particularly, to a liquid-crystal tilt servo apparatus having a liquid crystal device for correcting a tilt error.

2. Description of Related Art

In a recording/reproducing apparatus of an optical disc such as CD (Compact Disc), DVD (Digital Versatile Disc), or the like, generally, a deviation occurs between an optical axis of a laser beam irradiated from an optical pickup and a direction normal to the optical disc at the beam irradiating position due to a warp or the like of the optical disc. An angle of such a deviation is called a tilt angle, and occurs mainly in the direction of radius of the optical disc (hereinafter, referred to as "radial direction"), and which causes a coma-aberration or the like of an optical system. When the tilt angle occurs, therefore, signal deterioration such as crosstalk to an adjacent track, jitter, or the like is caused and exerts an adverse influence on the reproducing quality of the optical disc. Particularly, in the case of performing a high density recording like a DVD, since it is necessary to shorten a wavelength of the laser beam and to increase a numerical aperture NA of an objective lens in order to reduce a spot diameter of the laser beam, a margin for the tilt angle decreases. That is, even if the optical disc is slightly inclined, the reproducing quality is greatly deteriorated. To correct an aberration due to the tilt angle during the reproduction of the optical disc, therefore, a disc player is generally provided with a tilt servo mechanism for correcting the tilt error on the basis of a detection signal intensity of the reflected laser beam. As one of such tilt servo systems, there is a liquid-crystal tilt servo apparatus using a liquid crystal device. The principle of the liquid-crystal tilt servo is that a wave front aberration occurring due to a tilt of an optical disc can be compensated by controlling a liquid crystal, which is provided in the optical pickup, to cancel a phase change of the laser beam. A liquid-crystal tilt servo apparatus using a liquid crystal device for compensating the wave front aberration has been disclosed in Japanese Patent Application Kokai No.10-172163 filed by the present applicant.

In the conventional liquid-crystal tilt servo apparatus, a predetermined voltage is applied as a reference voltage to a liquid crystal device and a driving voltage for changing a phase is applied relative to the reference voltage. A driving circuit of the liquid crystal is, therefore, complicated and a DC component is introduced into the liquid crystal and causes deterioration of the liquid crystal.

OBJECTS AND SUMMARY OF THE INVENTION

The present invention is made in consideration of the problems and it is an object of the present invention to provide a liquid-crystal tilt servo apparatus having a simple circuit configuration in which there is no need to generate a reference voltage and deterioration of a liquid crystal can be avoided.

A liquid-crystal tilt servo apparatus according to the present invention comprises: a photodetector for detecting a reflection light beam of a laser beam irradiated to an optical recording medium; a liquid crystal device for correcting a tilt error caused by a tilt angle between an optical axis of the laser beam and a direction normal to the optical recording medium at a laser beam irradiating position; a control apparatus for generating a control signal for controlling the liquid crystal device on the basis of the detected signal intensity of the photodetector; and a driving circuit for generating a driving signal to drive the liquid crystal device on the basis of the control signal, wherein the driving circuit has a DC removing filter for removing a DC component in the driving signal and supplying a resultant signal to the liquid crystal device.

According to another aspect of the present invention, the DC removing filter comprises: a coupling capacitor for coupling the driving circuit and the liquid crystal device; and a resistor connected between an output terminal of the coupling capacitor and a ground terminal, wherein the capacitance of the coupling capacitor is larger than the internal capacitance of the liquid crystal device and the resistance of the resistor is smaller than the internal resistance of the liquid crystal device.

DETAILED DESCRIPTION OF THE PREFERRED EMBODIMENTS

Figure 1:
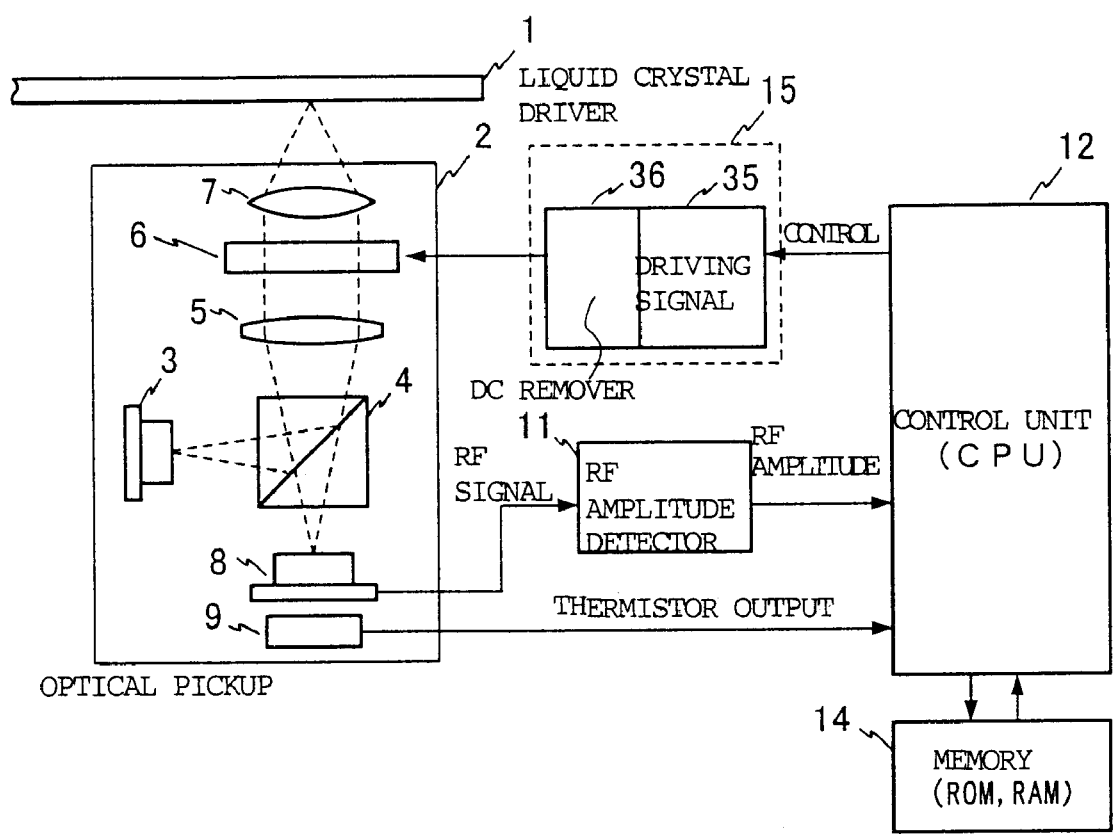
FIG. 1 is a block diagram schematically showing a configuration of a tilt servo apparatus of an optical disc player according to an embodiment of the present invention.

Embodiments of the present invention will now be described in detail with reference to the drawings. In the diagrams which will be explained hereinbelow, substantially similar or equivalent portions are designated by the same reference numerals.

FIG. 1 is a block diagram schematically showing a configuration of a liquid-crystal tilt servo apparatus of an optical disc player according to an embodiment of the present invention. As shown in FIG. 1, the tilt servo apparatus comprises: an optical disc 1; an optical pickup 2; an RF amplitude detector 11; a control unit 12 made up of a CPU; a memory 14 which is constructed by ROM and RAM and is connected to the control unit 12; and a liquid-crystal driving circuit 15. The optical pickup 2 has a laser beam source 3, a half prism 4, a collimator lens 5, a liquid crystal device 6, an objective lens 7, a photodetector 8, and a thermistor 9. A driving signal generating circuit 35 and a DC removing circuit 36 are provided in the liquid-crystal driving circuit 15.

The laser beam irradiated from the laser beam source 3 in the optical pickup 2 is reflected by the half prism 4 and, thereafter, is converted to a parallel light beam by the collimator lens 5. The light beam, then, passes through the liquid crystal device 6, and is collected by the objective lens 7 to be incident on an information recording surface of the optical disc 1. The light beam reflected by the optical disc 1 is formed as an image on the photodetector 8 through the objective lens 7, the liquid crystal device 6, the collimator lens 5, and the half prism 4. Information data recorded on the rotating optical disc 1 in this manner is detected by the photodetector 8. The detected RF signal is sent to the RF amplitude detector 11. An aberration caused in the optical system due to a tilt angle can be corrected by the liquid crystal device 6 arranged in the optical pickup 2. The operation of the liquid crystal device 6 will be described hereinbelow. The RF amplitude detector 11 detects an envelope of the received RF signal and transmits the detected RF envelope signal (hereinafter, referred to as RF amplitude signal) to the control unit 12. A signal which indicates an environmental temperature of the optical pickup 2 is supplied from the thermistor 9 to the control unit 12. The control unit 12 sends a data control signal for correcting the tilt error to the liquid-crystal driving circuit 15 on the basis of the RF amplitude signal, the environmental temperature signal, and data stored in the memory 14 which includes the ROM and the RAM. The liquid-crystal driving circuit 15 generates a driving signal on the basis of the control signal. The liquid crystal device 6 varies a phase difference of the light beam passing through the liquid crystal device 6 in response to the driving signal and serves as tilt error correcting means by correcting the aberration.

A configuration of the liquid crystal device 6 will now be described.

Figure 2:
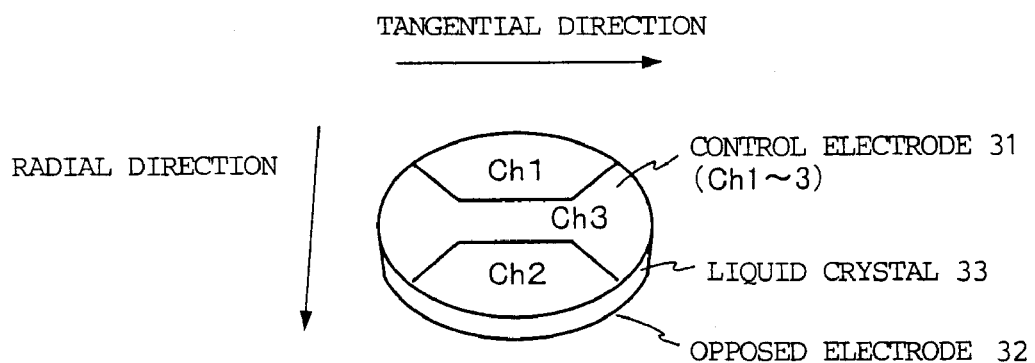
FIG. 2 is a diagram showing a configuration of a liquid crystal device.

As shown in FIG. 2, the liquid crystal device 6 is formed in a manner such that a control electrode 31 made of an ITO (indium-tin oxide) film, an opposed electrode 32, and a polarization film (not shown) are formed on each inner surface of two transparent glass substrates (not shown), and a liquid crystal 33 having birefringence characteristic such as a nematic liquid crystal or the like is sealed between the polarization films. The control electrode 31 is electrically divided into a plurality of portions with respect to the radial direction and tangential direction (i.e., tangential direction of the tracks). A driving signal from the liquid-crystal driving circuit 15 is supplied to each of the divided electrodes and variably controlled. Although FIG. 2 shows an example in the case where the control electrode 31 is divided into three regions (hereinafter, referred to as "channels") Ch1 to Ch3, the shape of the divided electrodes and the number of divisions are not limited to those mentioned above.

Each channel of the liquid crystal device 6 has an internal capacitance $C_L$ and an internal resistance $R_L$. For example, the internal capacitance is on the order of hundreds of pF and the internal resistance is on the order of a few MΩ.

The correcting operation of the aberration of the liquid crystal device 6 will now be described.

First, when the disc is inclined with respect to the optical axis of the objective lens 7, a front wave aberration occurs and the light spot on the disc deteriorates. Most of the wave front aberration is a coma aberration. A distribution curve of the wave front aberration on the pupil of the objective lens 7 hardly changes in dependence on the tilt angle. In a small tilt angle range of about 1°, the wave front aberration amount is almost proportional to the tilt angle. A dividing pattern of the liquid crystal device 6 is determined on the basis of, for example, the distribution curve. By controlling the individual driving voltage of the plurality of the divided regions, the phase difference of the light passing through each divided region can be individually changed, so that the aberration occurring due to the tilt can be corrected. A driving amount to be applied to each divided region of the liquid crystal device 6 has been stored in the ROM of the memory 14 in correspondence to a tilt correction amount. Since phase characteristics and response characteristics of the liquid crystal change due to the temperature, a liquid-crystal driving amount for phase correction corresponding to the tilt correction amount also changes. Data for the temperature fluctuation, therefore, is also stored in the ROM. The optimum phase correction control is made on the basis of the aforementioned data.

Figure 3:
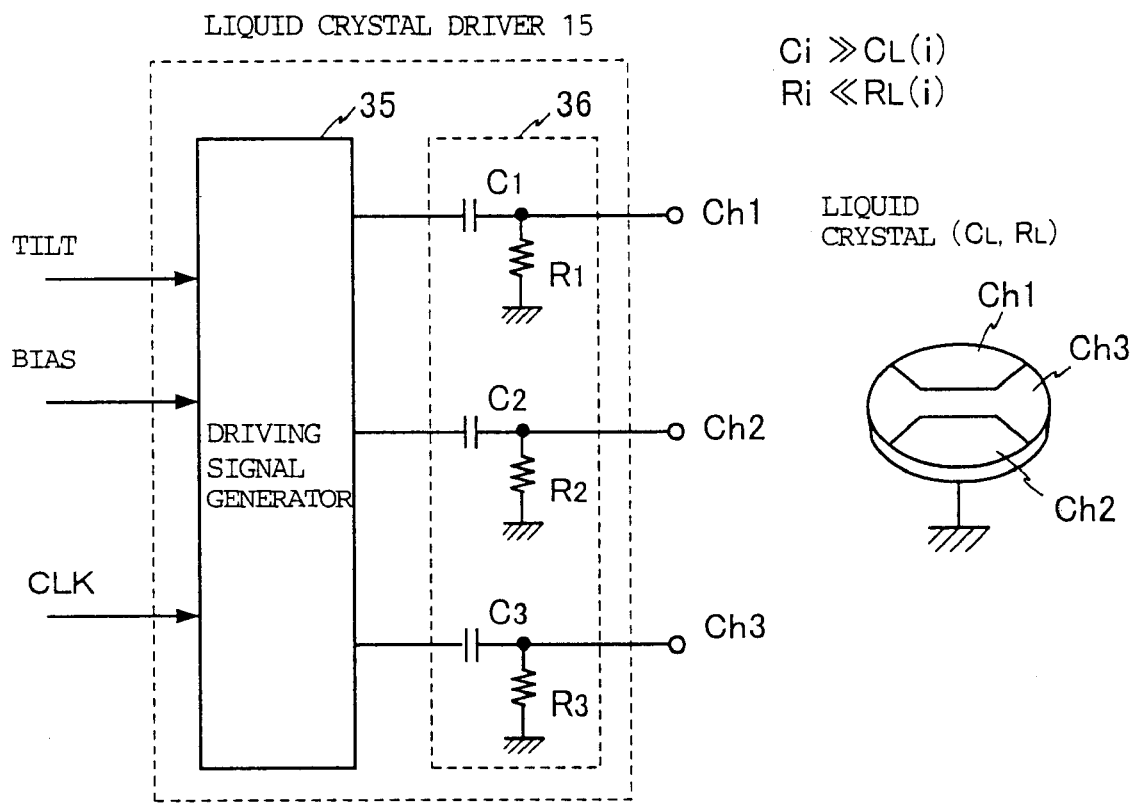
FIG. 3 is a diagram showing a configuration of a driving circuit of a liquid crystal for tilt servo according to the embodiment of the present invention.

FIG. 3 is a diagram showing a configuration of the driving circuit of the liquid-crystal tilt-servo apparatus according to the embodiment of the present invention. As shown in FIG. 3, the liquid-crystal driving circuit 15 has the driving signal generating circuit 35 and the DC removing circuit 36 comprising a capacitor $C_i$ and a resistor $R_i$ (i=1~3) is provided between the driving signal generating circuit 35 and a driving signal output terminal to each channel.

A tilt signal, a bias signal, and a clock (CLK) signal (for example, 10 kHz) are supplied from the control unit 12 to the driving signal generating circuit 35. The bias signal is a signal showing a bias point at which the liquid crystal device 6 is operated. Typically, a center voltage in a region where the phase characteristics of the liquid crystal is linear is designated. The bias signal is changed by the control unit 12 in accordance with the temperature characteristics of the liquid crystal. A signal for phase correction corresponding to the tilt correction amount is supplied as a tilt signal.

The operation of the liquid-crystal driving circuit 15 in the embodiment will now be described hereinbelow with reference to FIGS. 4A, 4B, 5A and 5B. For simplicity, explanation will be made with respect to one channel of the liquid crystal device 6 in the diagrams.

Figure 4A:
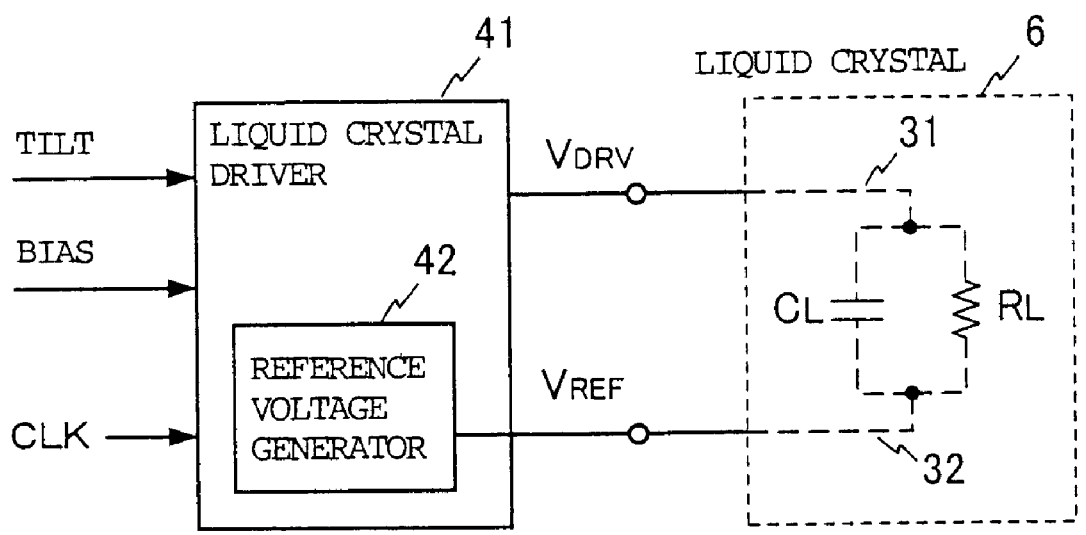
FIG. 4A is a block diagram showing a conventional liquid-crystal driving circuit.
Figure 4B:
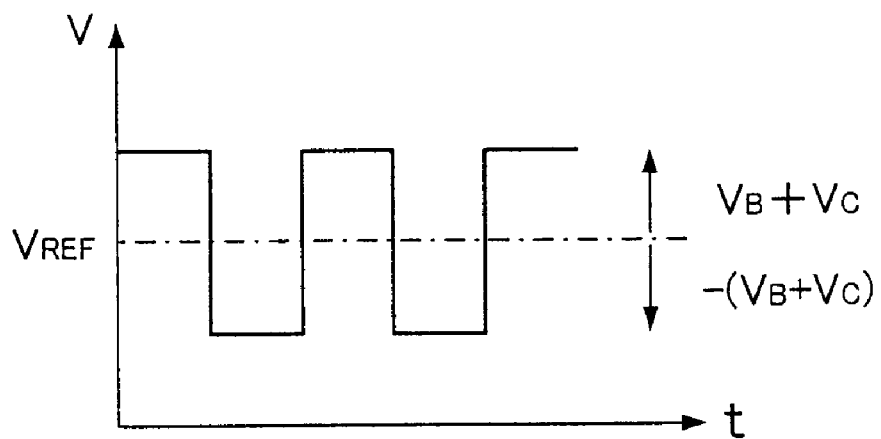
FIG. 4B shows a rectangular driving signal from the conventional liquid-crystal driving circuit.

FIG. 4A is a block diagram showing a conventional liquid-crystal driving circuit. A conventional liquid-crystal driving circuit 41 has a reference voltage generating circuit 42 for generating a reference voltage $V_{REF}$. First, in the liquid-crystal driving circuit 41, a bias voltage $V_B$ is formed by a bias signal which is supplied from the control unit 12 and indicates a bias point at which the liquid crystal device 6 is operated. The liquid-crystal driving circuit 41 adds a tilt correction voltage $V_C$ to the bias voltage $V_B$ in accordance with a tilt signal showing a phase correction amount corresponding to a tilt correction amount and adds the reference voltage $V_{REF}$ from the reference voltage generating circuit 42 to the obtained voltage. The voltage obtained by the addition is supplied to a chopper circuit (not shown) in the liquid-crystal driving circuit 41. The chopper circuit forms a rectangular wave by using the clock signal supplied from the control unit 12 and generates the rectangular wave as a liquid-crystal driving signal. As shown in FIG. 4B, the rectangular wave output has an amplitude of $\pm(V_B+V_C)$ at a frequency of the clock signal around the reference voltage $V_{REF}$ as a center voltage. A driving voltage of $V_{REF}\pm(V_B+V_C)$ is applied to the control electrode 31 of the liquid crystal device 6.

Figure 5A:
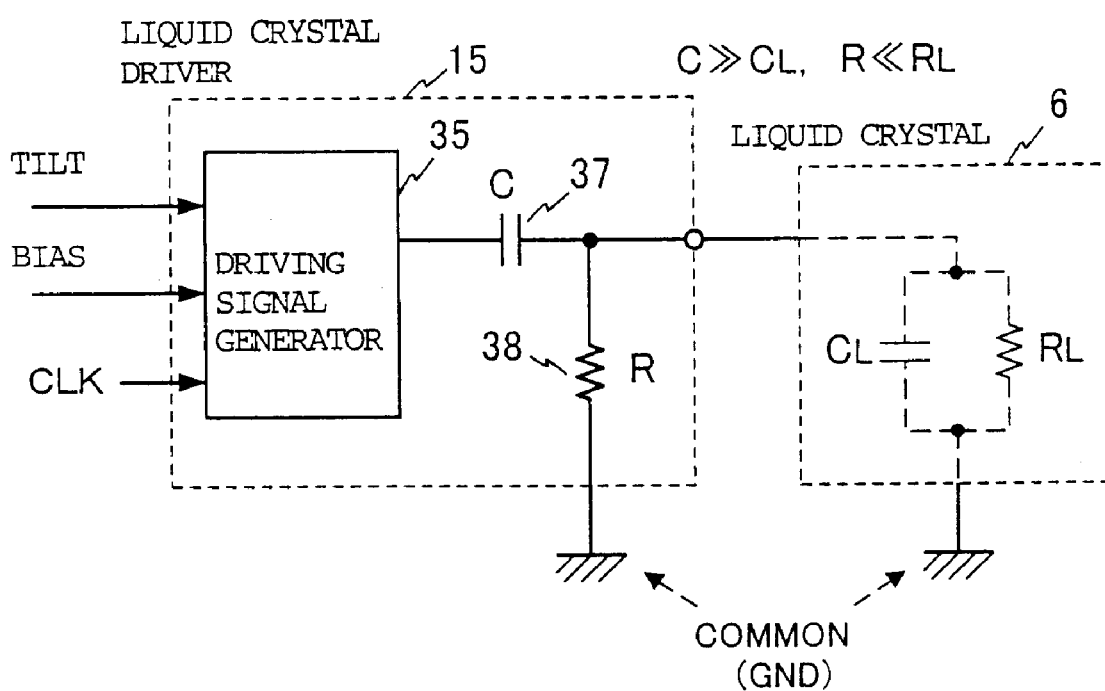
FIG. 5A is a block diagram showing a liquid-crystal driving circuit according to an embodiment of the present invention.
Figure 5B:
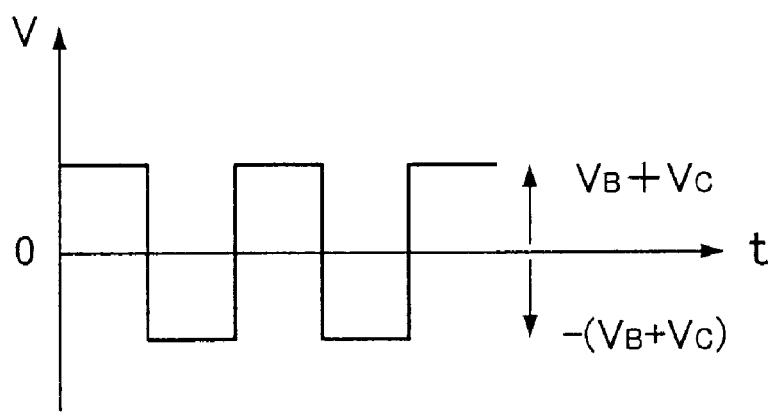
FIG. 5B shows a rectangular driving signal from the liquid-crystal driving circuit according to an embodiment of the present invention.

The DC removing circuit 36 comprising the driving signal generating circuit 35, a capacitor 37, and a resistor 38 is constructed in the liquid-crystal driving circuit 15 of the embodiment shown in FIG. 5A. The driving signal generating circuit 35 is a circuit equivalent to a circuit obtained by omitting the reference voltage generating circuit 42 from the liquid-crystal driving circuit 41 in FIG. 4A. That is, in the driving signal generating circuit 35, the bias voltage $V_B$ is formed by a bias signal supplied from the control unit 12. A center voltage (for example, about 2V) of the region where the phase characteristics of the liquid crystal is linear is generally used as a bias voltage $V_B$. As mentioned above, the bias voltage $V_B$ is changed by the control unit 12 in accordance with the temperature characteristics of the liquid crystal. Further, in the driving signal generating circuit 35, the bias voltage $V_B$ is corrected in accordance with the tilt signal and the tilt correction voltage $V_C$ is added to the bias voltage $V_B$. The resultant voltage is supplied to the chopper circuit (not shown) in the driving signal generating circuit 35. A liquid-crystal driving signal of a rectangular wave having the frequency of the clock signal is generated. The liquid-crystal driving signal is supplied to the DC removing circuit 36 and the driving signal which does not have any DC component is applied to the liquid crystal device 6. The rectangular wave output has an amplitude of $\pm(V_B+V_C)$ with a voltage level of 0V as a centerline at the frequency of the clock signal as shown in FIG. 5B.

Figure 6:
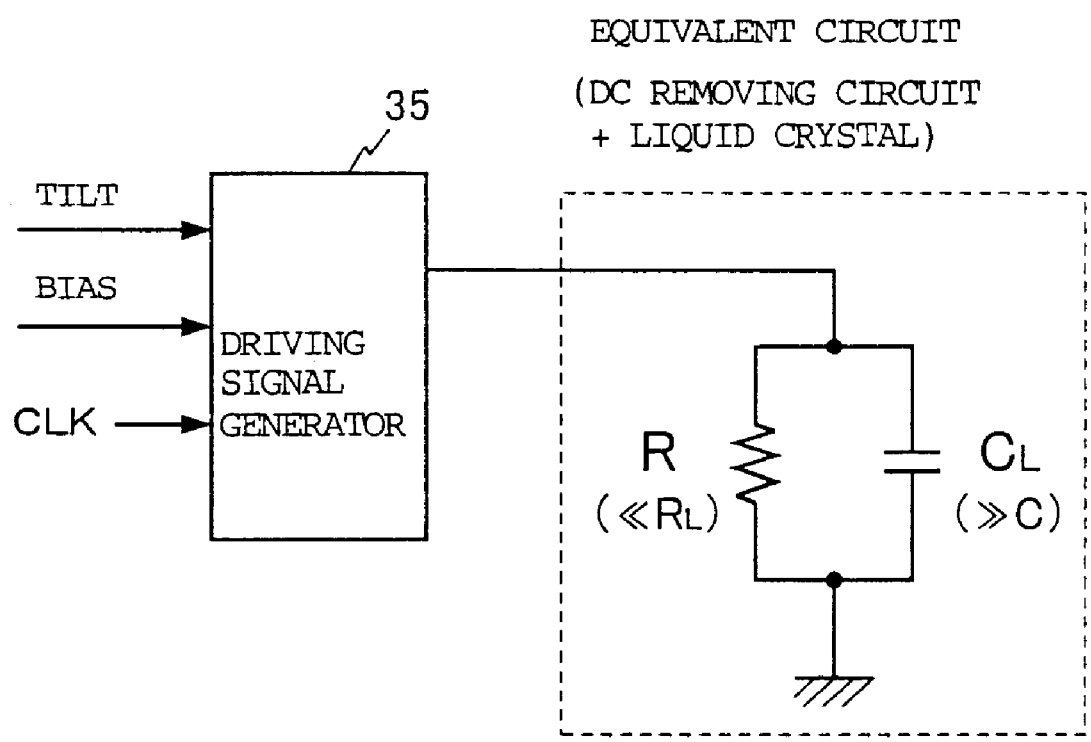
FIG. 6 is a diagram showing an equivalent circuit of a circuit comprising a DC removing circuit and a liquid crystal device.

A capacitance (C) of the capacitor 37 is selected so as to be larger than an internal capacitance ($C_L$) of the liquid crystal device 6, i.e., $C>>C_L$. A resistance value (R) of the resistor 38 is selected so as to be smaller than the internal resistance ($R_L$) of the liquid crystal device 6, i.e., $R<<R_L$. As mentioned above, the internal capacitance of the liquid crystal device 6 is on the order of hundreds of pF and the internal resistance is on the order of a few MΩ. As a capacitor 37 and a resistor 38, for example, a capacitor of 0.1 $\mu$F and a resistor of 150 kΩ can be used. In this case, an equivalent circuit of the circuit comprising the DC removing circuit 36 and liquid crystal device 6 when it is seen from the driving signal generating circuit 35 is a parallel circuit of the resistor R and capacitor $C_L$ as shown in FIG. 6. Thus, there is no need to change the circuit configuration of the driving signal generating circuit 35. Therefore, the reference voltage generating circuit is also unnecessary and the liquid crystal device 6 can also be driven by the driving signal having no DC component.

In the configuration of the driving circuit shown in FIG. 3, a value of each of a capacitor $C_i$ and a resistor $R_i$ (i=1~3) of the DC removing circuit 36 connected to the driving signal output terminal to each channel of the liquid crystal device 6 can also be similarly set. The capacitance value and the resistance value can be independently set for each channel so long as they satisfy the foregoing conditions.

As will be obviously understood from the above description, according to the present invention, by providing the DC removing circuit for removing the DC component of the driving signal, the reference voltage generating circuit is unnecessary for the liquid-crystal driving circuit and a tilt servo apparatus having a simple circuit configuration can be realized. A tilt servo apparatus of high reliability which can avoid deterioration of the liquid crystal due to the DC component can be realized.

The invention has been described with reference to the preferred embodiments thereof. It should be understood by those skilled in the art that a variety of alternations and modifications may be made from the embodiments described above. It is therefore contemplated that the appended claims encompass all such alternations and modifications.

What is claimed is:

1. A liquid-crystal tilt servo apparatus comprising:
   a photodetector for detecting a reflection light beam of a laser beam irradiated to an optical recording medium;
   a liquid crystal device for correcting a tilt error caused by a tilt angle between an optical axis of said laser beam and a direction normal to said optical recording medium at a laser beam irradiating position;
   a control apparatus for generating a control signal for controlling said liquid crystal device on the basis of the detected signal intensity of said photodetector; and
   a driving circuit for generating a driving signal to drive said liquid crystal device on the basis of said control signal,
   wherein said driving circuit has a DC removing filter for removing a DC component in said driving signal and supplying a resultant signal to said liquid crystal device, and
   wherein said control signal includes a bias signal, a tilt signal and a clock signal, said bias signal representing a bias point at which said liquid crystal device is operated, said tilt signal corresponding to a tilt correction amount of said liquid crystal device, and
   said driving signal has a voltage amplitude of the sum of a bias voltage and a tilt correction voltage around a predetermined equilibrium voltage, and a frequency of the clock signal, the bias voltage being generated based on said bias signal, the correction voltage corresponding to the tilt correction amount.

2. An apparatus according to claim 1, wherein said DC removing filter comprises: a coupling capacitor for coupling said driving circuit and said liquid crystal device; and a resistor connected between an output terminal of said coupling capacitor and a ground terminal, wherein the capacitance of said coupling capacitor is larger than the internal capacitance of said liquid crystal device and the resistance of said resistor is smaller than the internal resistance of said liquid crystal device.

* * * * *